C. G. Gumpel.
Lock.
N° 96,802. Patented Nov. 16, 1869.
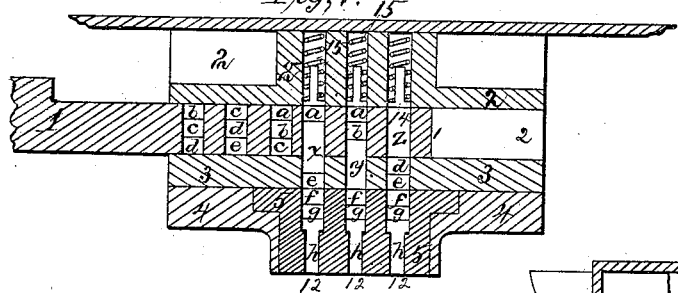
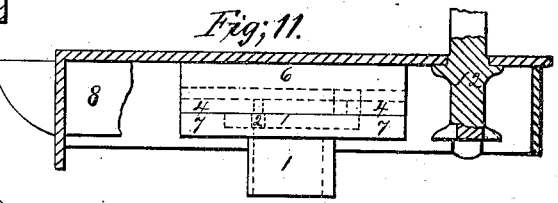
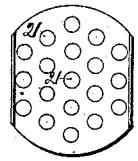
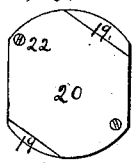
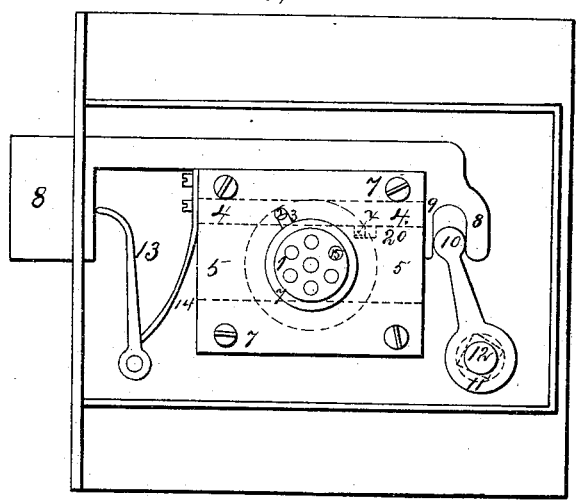
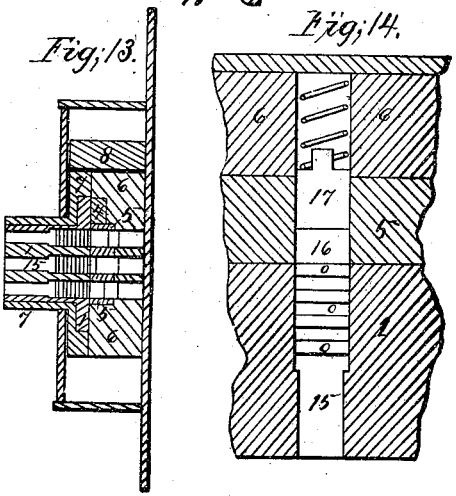
Witnesses:
O. Hinchman
Mok Brooks
Inventor:
Chas G. Gumpel
Per Munn & Co.
Attorneys

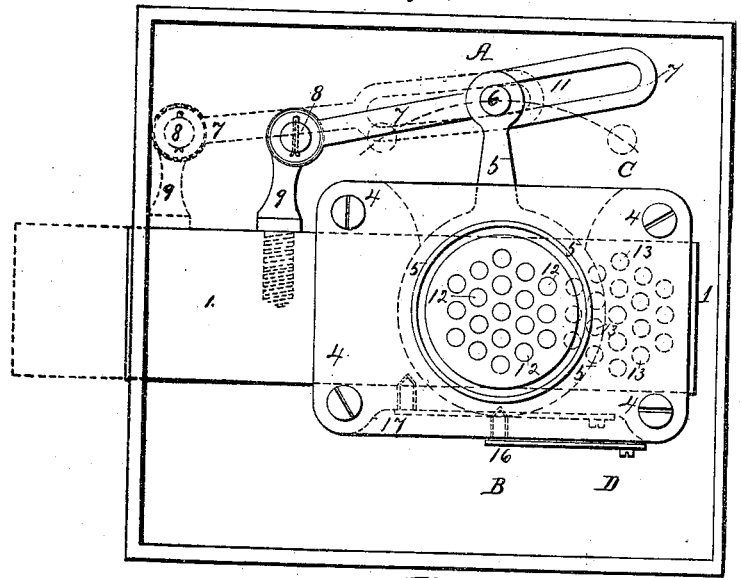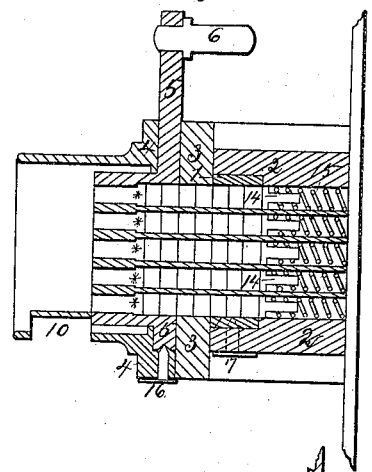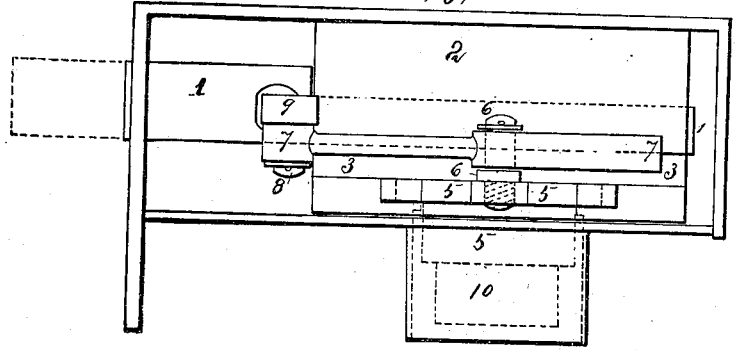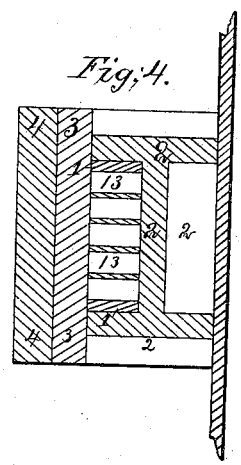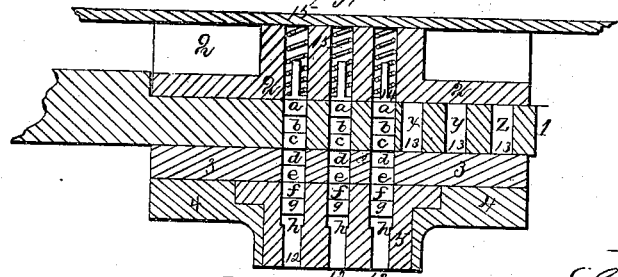

United States Patent Office.

CHARLES GODFREY GUMPEL, OF LEICESTER SQUARE, ENGLAND.

Letters Patent No. 96,802, dated November 16, 1869.

---

IMPROVEMENT IN DOOR-LOCKS.

---

The Schedule referred to in these Letters Patent and making part of the same.

---

*To all whom it may concern:*

Be it known that I, CHARLES GODFREY GUMPEL, of Leicester Square, in the county of Middlesex, in England, have invented a new and useful Improvement in Locks and Latches; and I do hereby declare that the following is a full, clear, and exact description thereof, which will enable others skilled in the art to make and use the same, reference being had to the accompanying drawings, forming part of this specification.

My invention relates to locks; and

It consists in the use of sliders or pins, cut into suitable lengths, and passing through the bolt, the shifter or piece acting thereon, and the fixed guide-plates in which the bolt slides, the arrangement being such that when the bolt is shut, the divisions of the pins will be distributed unequally in the perforations of the fixed and guide-plates, the turning-piece or shifter, and the bolt, thereby effectually preventing the latter from being moved back, except by the application of the key, having the same construction and arrangement of pins as that employed to operate the bolt in the first instance; and It also consists in the combination, arrangement, and construction of parts, all as hereinafter fully described.

Figure I shows the lock, with the plate-cover removed, in which the bolt 1 has a projecting arm, 9, carrying a pin or pivot, 8, to which a connecting-link, 7, is attached.

This link has a slot in which a pin, 6, gears, this pin being fixed in an arm or lever of the bolt-shifter, 5.

The bolt 1 slides in a recess (see Figures 3 and 4,) formed in the solid block or bolt-guide 2, and is held in its place by a plate or guide-plate, 3.

On this plate, the bolt-shifter 5 is held in position, by another plate or cap, 4, which is provided with a projecting tube surrounding the round body-part of the bolt-shifter, so as to leave only the flat front surface of the latter exposed, as shown in Figures 5 and 7.

The bolt-shifter 5, the plate 3, the bolt 1, and the bolt-guide 2, are perforated with any suitable number of holes, of any convenient section, the perforations through the various parts mentioned, corresponding with each other, as shown in figs. 3 and 5.

The bolt, however, possesses another set of perforations, indicated by dotted circles, 13, fig. 1, and also shown at 13 in figs. 4 and 5, when the bolt is shot, (the lock is locked,) then these second perforations of the bolt take such a position as to correspond with the perforations of the bolt-guide 2, the plate 3, and the bolt-shifter 5, as shown in fig. 7.

The perforations are filled up by sliders or pins, (lock-pins,) which latter are divided into certain equal lengths, as shown in fig. 5, and are marked, respectively, *a b c d e f g*. Three of these, *a b c*, fill up exactly each perforation of the bolt, and the plate 3 is made of such a thickness that two lengths of the lock-pins *d e*, in fig. 5, fill up one of the perforations in the plate 3. Another two lengths of each lock-pin, viz, *f g*, are contained in the bolt-shifter 5, the remaining part of the perforations in the bolt-shifter being filled up by a pin provided with a shoulder, resting against a ridge in the perforation formed by a reduced size of the latter.

These parts of the lock-pins, marked *h*, have their ends, 12, flush with the surface of the bolt-shifter, and are formed of such a length that when pushed into the bolt-shifter, through a space a trifle more than the thickness of the plate 3, (viz, two lengths of the lock-pins,) the end of their thinner portion cannot reach the wider part, marked *x* in fig. 3, of the perforation, so as to be caught accidentally by the projecting ridge.

The said space, through which only the pins can be pushed, is determined by those portions of the lock-pins marked 14, contained in the bolt-guide 2, as they are of such a length as to strike against the back plate of the lock, when the lock-pins have been pushed into the lock to their fullest extent.

These parts of the pins 14 are sufficiently reduced in their diameter, for the greater part of their length, so as to admit a spiral spring to surround each of them, as shown at 15, figs. 3, 5, and 7, some only shown and marked, the object of which spring is to hold its respective lock-pins in position, and replace the same after having been pushed into the lock, and the key removed. It is evident, that the only way in which the bolt can be acted on, is through the bolt-shifter, whilst this latter presents no means of being moved except by an instrument which can push the lock-pins into the lock, and by inserting itself into the perforations of the bolt-shifter. This is effected by the key, which is provided with a number of projecting pins (key-pins) corresponding in their positions to the perforations in the bolt-shifter.

The key, as represented in Figures 6, 8, and 9, consists of the key-holder 18, provided with a suitable cross-handle, (not shown in the figure,) and at the other end with a dovetailed groove to receive the key proper.

This latter is formed by the body-piece 19, in which the necessary number of perforations, 21, some only marked, is made to receive the key-pins 22, some only marked, the object of which is to displace the lock-pins *z* in the bolt-shifter, and to gear into the latter, for the purpose of rotating it, and, through it, shooting forward or withdrawing the bolt 1.

The lock-pins 22 are held in the body of the key 19, by the plate 20, secured either by two screws or any other suitable means. The body of the key is shaped to fit into the dovetailed groove of the key-holder 18. When desirable, this latter may be secured in the prolonged tube of the cap 4, in which case the key-holder is supplied with a short tube to fit in the prolonged tube of the cap 4, and held in it by means of a pin screwed into the key-holder, and working in a slit cut into the outer tube.

The key proper is then introduced into the key-holder through the aperture 10, as shown in figs. 2 and 3.

The action of the lock is as follows:

As represented in fig. 6, the key is provided with two key-pins, one of such length as to push the lock-pin through one division, the second pin to push the corresponding lock-pin through two divisions, whilst the third lock-pin is not acted on by any key-pin. On introducing the key into the bolt-shifter, (see fig. 5,) the left lock-pin is pushed through one of its divisions, (or parts,) and instead of parts $a\ b\ c$ filling the perforation of the bolt, $a$ will be pushed into the bolt-guide 2, whilst parts $b$, $c$, and $d$ will fill the perforations in the bolt. In the same manner, the centre pin being pushed through two divisions, (or lengths, or parts,) the parts $c\ d\ e$ will fill the perforation in the bolt, whilst the right lock-pin, not being pushed by a key-pin, will remain in its original position. Upon turning the key-holder to the left, (see fig. 1,) the lever of the bolt-shifter, applying itself by means of the pin 6 to the connecting-link 7, and through this and the arm 9 to the bolt 1, the latter will be moved forward until the base of the arm 9 strikes against the front plate, or until any other suitable check occurs.

In this position the bolt will be temporarily held, by means of the spring 17, which gears, by means of a pointed plug, into a concavity of the bolt, as shown in figs. 1 and 3, whilst the key-holder, and with it the bolt-shifter, can be returned to their original position.

From fig. 7, it will be seen that the bolt, when being moved forward, carries with it the various parts of the lock-pins, for the time contained in it, viz, $b\ c\ d$ of the left, $c\ d\ e$ of the middle, and $a\ b\ c$ of the right pin, and has brought forward, to fill their places, the pieces $x\ y\ z$, contained in the second set of perforations, marked 13. Upon the bolt-shifter reaching the original position, after having shot the bolt, in which position it is held by the spring 16 in the same way as the bolt is held by the spring 17, the respective perforations will correspond with each other, and the spiral springs 15 will press the lock-pins against the key-pins, the key will be pushed out of the bolt-shifter, and the pins pushed into their original position, whilst the parts $x\ y\ z$ will take respectively the positions of the parts $b\ c\ d$, $c\ d\ e$, and $a\ b\ c$, carried away by the bolt; that is, $x$, in the left pin, will have two-thirds of its length in the bolt, and one-third in the plate 3; $y$ will have one-third of its length in the bolt, and two-thirds in plate 3; whilst $z$ retains its position in the bolt. It is evident, that in this position the bolt cannot be withdrawn unless the key first pushes the parts $x$ and $y$, so as to fill the perforations in the bolt, that is to say, to use the key with the key-pins in the same position in which it was used for throwing the bolt forward.

To show the nature of the arrangement, and the effect of either the key being used with the pins in a wrong position, or an attempt being made at picking the lock, let it be supposed that the pins in the key are placed as follows: the long key-pin to fill the left, and the short one, the right place in the key, while the centre hole is left without a pin. If, now, the key were pressed into the bolt-shifter, the part $x$ of the left lock-pin would be pushed through two divisions, and, hence, would have one-third of its length in the bolt-guide 2, and two-thirds in the bolt; the part $y$ of the centre lock-pin would retain its position, not being acted on by any key-pin; while the part $z$, in the right lock-pins would be pushed through one division, and, hence, would have one-third of its length in the bolt-guide, and two-thirds in the bolt.

Upon turning the bolt-shifter to the right, for the purpose of withdrawing the bolt, it will be possible to rotate it until the pin 6 (fig. 1) of the bolt-shifter touches the end of the slot 11 of the connecting link, shown in dotted lines. The further rotation is prevented by the pieces $x\ y\ z$, holding the bolt. Any attempt, in this position, at ascertaining which of the lock-pins prevents the bolt from being withdrawn, is made impossible, as the slight rotation of the bolt-shifter required to bring the pin 6 to bear against the connecting-link 7, at 11, and the bolt 1, has destroyed the correspondence between the various parts of the lock-pins, and it becomes evident, therefore, that unless these pins are all respectively pressed into that position in which they were when the bolt was shot forward, the lock cannot be opened, while picking by the tentative process becomes impossible, from the fact that when the bolt-shifter is rotated, for the purpose of applying pressure to the bolt, to withdraw it, this rotation of the bolt-shifter at the same time cuts off all access to those parts that prevent the bolt from moving.

On inspection of figs. 3, 5, and 7, it will be seen that the bolt-shifter can rotate whenever the divisions between the parts of the lock-pins (as between $e$ and $f$, or $f$ and $g$, or $g$ and $h$,) correspond with the surface of the plate 3 on which the bolt-shifter rests; but according as one of the lock-pins is pushed through one or two divisions, or not at all, so will the long part 13, here ($x\ y\ z$) brought forward with the bolt, take the place of the parts $b\ c\ d$, or $c\ d\ e$, or $a\ b\ c$.

The key in the lock represented is supplied with nineteen pins, and these can be arranged in any arbitrary position, if supplied with one set (in this case nineteen) of short, and one set (nineteen) of long pins, in over one hundred and thirty million different positions, but with only the same arrangement of key-pins can the bolt be withdrawn as that with which it was locked.

The number of pins, and their arrangement in regard to symmetry, are quite optional, as 6, 7, 9, 16, &c., would form suitable numbers.

Although the divisions of each lock-pin, as in the lock represented, are arranged to be, three in the bolt and two in the guide-plate 3, any other number and proportion may be adopted.

The connection between the bolt-shifter and the bolt may be constructed in a different manner, for instance, by means of teeth formed in the rim of the bolt-shifter gearing into a rack, which latter would push the bolt in such a manner, however, as to require the bolt-shifter and rack to move through a certain distance before the latter could apply any pressure on the bolt for withdrawing the same. An example of this connection between bolt and bolt-shifter will be found in the application of these improvements to the ordinary latch-lock, as represented in figs. 10 to 14.

Figure 10 shows the latch, with the plate-cover removed;

Figure 11 shows the same, with the upper rim and part of the bolt removed;

Figure 12 is part of the key, (the pin-arrangement in section;)

Figure 13 is the latch, in section, through the centre of the bolt-shifter; and

Figure 14 gives the arrangement of the bolt-shifter, auxiliary bolt, and bolt-guide, with the divisions of one lock-pin on a larger scale.

In these figures, 1 is the bolt shifter, held in position by the plate or cap 7, surrounding the bolt-shifter with a tube, as in the former lock.

The rim of the bolt-shifter has formed in it, radially, a slot, 3, to receive the pin 2 carried by the sliding bar 4.

This latter rests immediately upon the auxiliary bolt 5, both being held by and sliding in recesses formed in the guide-block or body 6.

At the lower edge of the bar 4, a projection, X, is formed, to receive which projection the auxiliary bolt 5 is cut out, but in such a manner that the bar 4 can be moved through a certain distance before its projection touches the end 20 of the recess in the auxiliary bolt.

8 is the latch-bolt, provided with a fork at 10, into which the end of a lever gears, which lever is turned by a handle on the inside of the door, for the purpose of withdrawing the bolt 8. The bolt is pressed forward by means of the spring 14 and the lever 13, or by any other suitable arrangement of spring.

The bolt-shifter 1, auxiliary bolt 5, and bolt-guide, or guide-block 6, are perforated by seven holes, to receive the lock-pins, the divisions of which are shown on an enlarged scale in fig. 14, from which it will be seen that the perforation of the bolt-shifter contains the part 15, besides a number of short pieces or disks, marked 0.

The rest of the lock-pin is formed of two pieces, 16 and 17, filling up the perforation in the bolt 5, and extending slightly into the bolt-guide 6, thereby preventing the auxiliary bolt 5 from being moved, unless the pin is pushed into the lock just far enough to bring the part 16, with four of the shorter pieces 0, into the perforation of the auxiliary bolt.

It is evident, that so long as the divisions between two of these shorter pieces 0 correspond to the surface of the bolt-shifter which touches the auxiliary bolt, the former can rotate to the right, pushing, by means of the pin 2, the bar 4 against the latch-bolt at 9, and moving them until the projection X touches the end of the recess in the auxiliary bolt 5, at 20, fig. 10, but unless this auxiliary bolt is set free by all pins being pushed into the exact position, as just above mentioned, the auxiliary bolt 5 cannot be moved.

The amount of rotation of the bolt-shifter, however, which is necessary to make the projection X touch the auxiliary bolt 5 at 20, is sufficient to cut off all access to the pins which hold the auxiliary bolt, as the only access to these pins is through those parts which are contained in the bolt-shifter, and that only when this latter is in the position shown in fig. 10, when the perforations through the various parts correspond with each other, which correspondence is, however, destroyed after the bolt-shifter has rotated through the least angle. This, however, is necessary to bring pressure to bear upon the auxiliary bolt, hence the lock cannot be picked.

This arrangement of pins, or sliders, as represented and above described, can be combined with the tumbler of the ordinary lock, the tumblers acting on the pins being themselves moved by a key, which may be made permutating in the arrangement of the bits of various length, as in the lock of Messrs. Day and Newall, or Hobbs. When the tumblers of the ordinary form of lock are thus used, the pins, or sliders, whether independent or held in and moved, each respectively, with a frame, may be pressed, by means of a spring or springs, against the tumblers, but cannot move until the tumblers are lifted by a key.

The form of lock just referred to would have the many disadvantages of the old form of locks, such as offering facilities for taking the impressions of the key from the tumblers, or for introducing gunpowder for blowing the lock off the door to which it is fastened, &c., all of which means cannot be employed against the special form of lock as represented and before described, the only chance left for the burglar being to drill out the pins, which can, however, be rendered impossible by hardening the bolt-shifter and the ends of the lock-pins. Even this would not be absolutely necessary, as no one of the pins could be drilled out by itself, through its facility to rotate with the drill; and to drill out the projection which prevents the lock-pins from coming out, is impossible, at least with the ordinary drill, as the lock-pin would not allow the drill to reach the projecting ridge.

Having thus described my invention,

I claim as new, and desire to secure by Letters Patent—

1. The bolt-shifter, the fixed and guide-plates and bolt, or the auxiliary bolt, provided with perforations extending transversely through them, and having divided pins or sliders inserted therein, all arranged to operate as set forth, whereby, when the bolt is shot, the divisions of said pins shall be distributed in the perforations of the various parts, as herein shown and described, for the purpose specified.

2. The arm or stud 9 carrying the pivot-pin 8, the bolt-shifter 5, provided with an arm carrying a pin, 6, working in the slotted connecting-link 7, and the spring stop-pins, or studs 17, all combined, constructed, and arranged with reference to the bolt 1, to operate as and for the purpose set forth.

The above specification of my invention signed by me, this    day of    , 1869.

CHARLES GODFREY GUMPEL.

Witnesses:
THOMAS MORGAN,
21 *Cockspur Street, London.*
JONATHAN PRUDAY,
25 *Sherborne Street, Dorset Square, London.*